United States Patent [19]
Dobbs et al.

[11] Patent Number: 5,794,087
[45] Date of Patent: *Aug. 11, 1998

[54] PHOTOGRAPHIC FILM PRE-EXPOSURE APPARATUS AND METHOD

[75] Inventors: Gregg T. Dobbs; Loura L. Dobbs. both of Windermere; John M. Dobbs. Winter Garden, all of Fla.

[73] Assignee: Keepsake, Inc., Windermere, Fla.

[*] Notice: The term of this patent shall not extend beyond the expiration date of Pat. Nos. 5,546,146 and 5,613,165.

[21] Appl. No.: 686,806

[22] Filed: Jul. 26, 1996

Related U.S. Application Data

[63] Continuation-in-part of Ser. No. 229,689, Apr. 19, 1994, Pat. No. 5,546,146.

[51] Int. Cl.$^6$ ............................................. G03B 41/00
[52] U.S. Cl. ........................... 396/322; 355/95; 355/132
[58] Field of Search ............................ 396/6, 322; 355/39, 355/40, 43, 77, 79, 95, 132

[56] References Cited

U.S. PATENT DOCUMENTS

| | | | |
|---|---|---|---|
| 5,546,146 | 8/1996 | Dobbs et al. | 396/322 |
| 5,613,165 | 3/1997 | Dobbs et al. | 396/322 |

*Primary Examiner*—David M. Gray
*Attorney, Agent, or Firm*—Allen, Dyer, Doppelt, Milbrath & Gilchrist, P.A.

[57] ABSTRACT

Bulk rolls of film are pre-exposed with a latent image of artwork positioned within a film frame. Multiple frames, each having an artwork image portion and an opaque portion, are formed within an imaging filmstrip formed in a continuous loop. The continuous loop is rotated while a portion of the filmstrip is in contact with a portion of the bulk film for transferring the artwork image from the filmstrip to the bulk film. The bulk film is advanced while a light source exposes the film when in contact with the filmstrip. The pre-exposed bulk roll of film is punched at preselected sprocket holes corresponding to the filmstrip length for providing a reference sprocket hole within each length of film cut from the bulk roll for loading within a camera for double exposure of the film and placement of a second latent image in juxtaposition with the artwork.

28 Claims, 6 Drawing Sheets

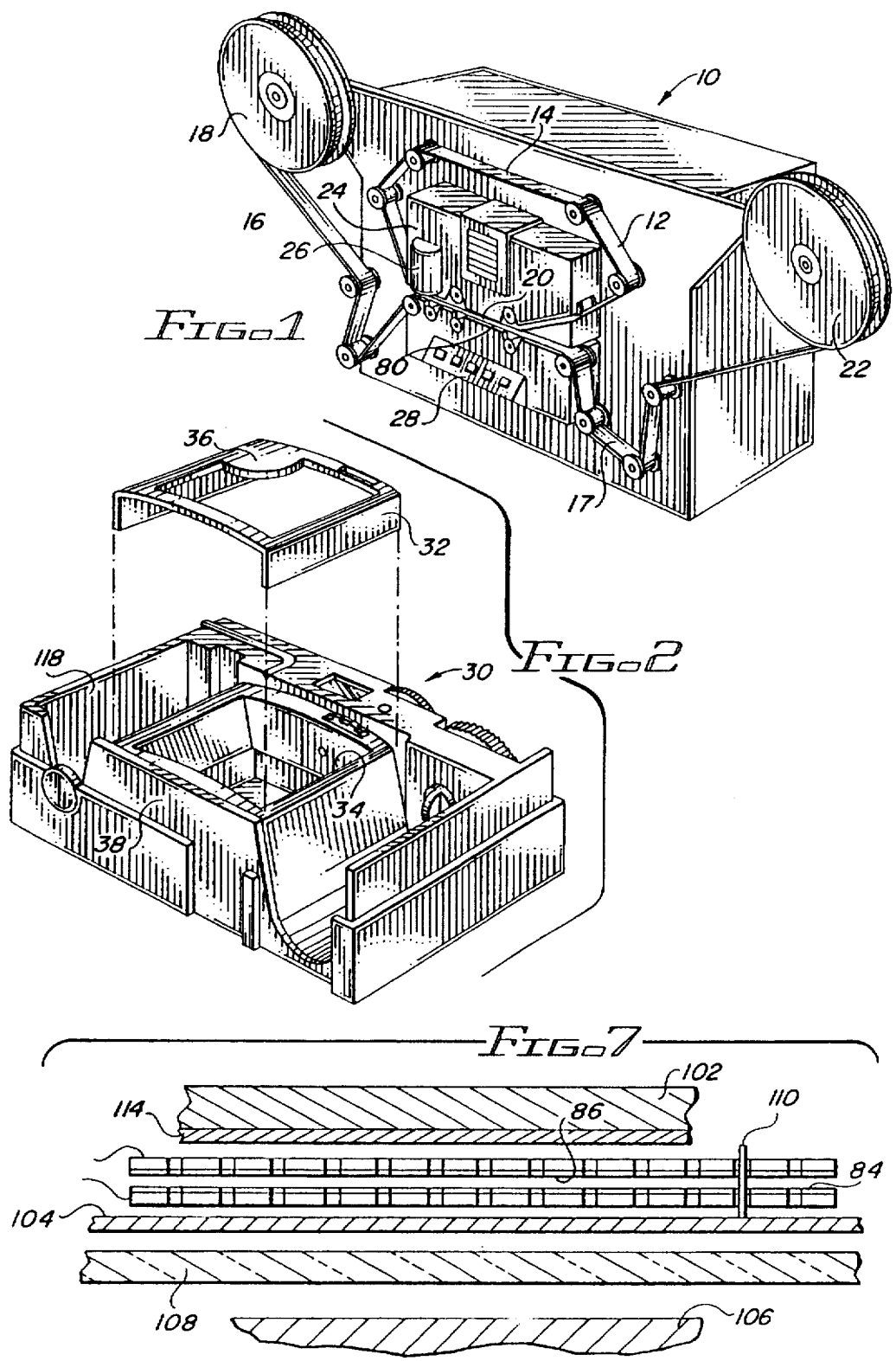

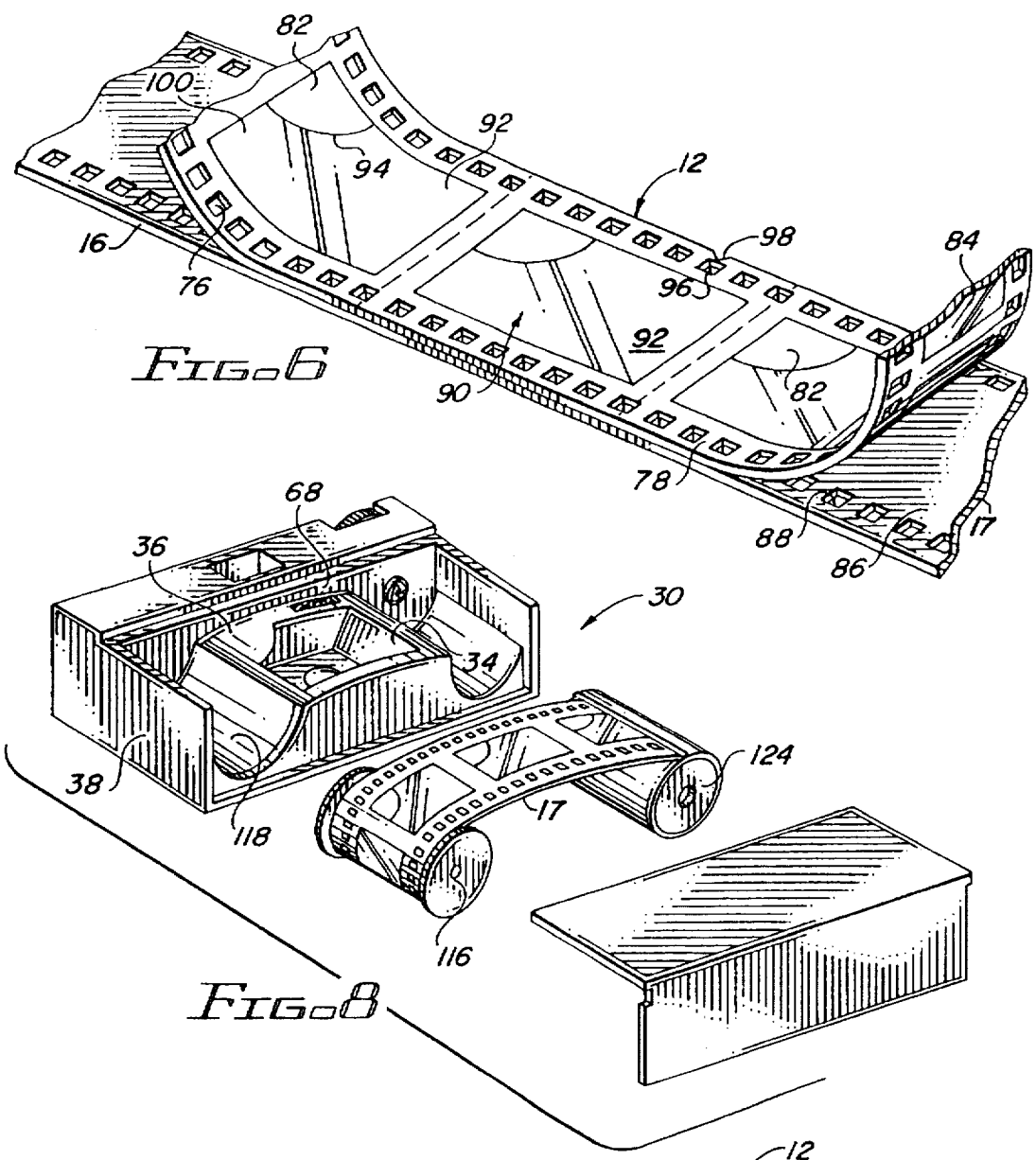
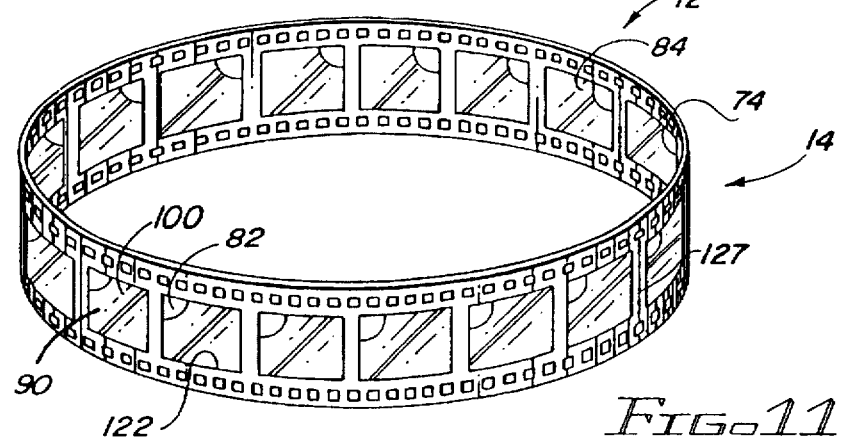

PHOTOGRAPHIC FILM PRE-EXPOSURE APPARATUS AND METHOD

CROSS REFERENCE TO RELATED APPLICATION

This application is a continuation-in-part of application Ser. No. 08/229,689 filed Apr. 12, 1994 now U.S. Pat. No. 5,546,146 for Single Use Camera Film Pre-Exposure Method, commonly assigned with the present invention.

BACKGROUND OF THE INVENTION

1. Field of the Invention

The invention relates to an apparatus and method for pre-exposing photographic film and positioning a latent image within a film frame for subsequent exposure of the film frame and development. In particular, the invention relates to pre-exposing a bulk roll of film with latent images in registration within respective film frames for a desirable alignment of each image within camera film frames for use of film rolls cut from the bulk roll and positioned within the camera.

2. Description of Background Art

Single use and inexpensive reusable cameras are well known in the art. They have proven particularly popular for fun photography requiring little more than an "aim and shoot" technique to create pleasing photographs. In an effort to further develop fun and excitement centered around the use of these cameras, many techniques have been developed for pre-exposing the film to be loaded within the camera for placing a latent image on film frames to create a pleasing photograph having the pre-exposed image in juxtaposition with a subject photographed by the single use camera.

U.S. Pat. No. 4,310,232 to Reed on discloses a photographic apparatus and method for adding artificial backgrounds and points out that a problem well known in the art is in the alignment of the subject of the second exposure with the unexposed portion of the film frame at the second exposure. U.S. Pat. No. 4,427,279 to Edelstein discloses an alignment technique including simultaneous exposure of the film frame within the camera. U.S. Pat. No. 4,707,106 to Johnson discloses masking portions of the film within a first exposure, then exchanging a mask and exposing the second or other portions.

U.S. Pat. No. 5,187,512 to Kirkendall discloses a film cassette containing pre-exposed film. During manufacture, each frame of a filmstrip has one portion masked while the frame is exposed to light. The light impinges on a second portion of the frame to form a latent image. The filmstrip is then mounted within a camera where a previously unexposed portion of the frame is exposed to a second image bearing light, while the pre-exposed portion of the frame is masked from the second light. The strip of film is then removed from the camera for developing juxtaposed latent images in a single photograph. Kirkendall '512 discloses pre-exposing a filmstrip to a single image located within a non-opaque area of a template or mask during manufacturing of the pre-exposed filmstrip and then masking a portion of a single use camera aperture frame opening for shielding that portion of the pre-exposed filmstrip having a latent image.

U.S. Patent issued to Dobbs et al. for a "Single Use Camera Film Pre-Exposure Method" discloses pre-exposing film so as to overcome alignment problems associated with the placement of desired artwork within the film frame beginning with exposure of the artwork for exposure through placement of the pre-exposed film within the camera. By way of example, if the pre-exposed film is loaded within the camera out of alignment with the camera film frame by only one sprocket hole, the resulting double exposed photograph will not be pleasing, and as has been experienced in the industry, will be viewed as undesirable by the user. While fun cameras are becoming less and less expensive, thus more and more desirable, users continue to expect the precision of the more sophisticated, more expensive, high precision 35 mm cameras. The Dobbs patent discloses a method for exposing film with a latent image, wherein the image is placed within precise registration with any subsequent image exposed within the film frame. One embodiment of the invention included the formation of an imaging filmstrip having artwork placed within multiple film frames. The imaging filmstrip is formed within a loop for positioning against an unexposed filmstrip for pre-exposing the unexposed filmstrip with the images placed on the loop of imaging filmstrip.

The present invention addresses the needs for providing pre-exposed film rolls from pre-exposed bulk film including the need for proper alignment of film rolls within the camera.

SUMMARY OF THE INVENTION

It is thus an object of the present invention to provide an apparatus for pre-exposing multiple images onto bulk film for subsequent preparation of the film for use in a single use camera.

When unexposed film comprises a bulk roll of film, the bulk roll of unexposed filmstrip is exposed to a multiplicity of frames by forming an imaging filmstrip into a continuous loop. A reference sprocket hole is identified within predetermined lengths of film for aligning film cut from the bulk roll within the camera. During exposure of the bulk film, a portion of the imaging filmstrip is placed in contact with a portion of the unexposed bulk roll film. The bulk roll and imaging filmstrip loop are advanced past a light source for pre-exposing the unexposed bulk roll film to frames of the imaging film. The bulk roll film and imaging filmstrip loop continue to be advanced past the light source for exposing the bulk roll film to the images on the imaging filmstrip, thereby placing latent images onto the bulk roll film. The bulk roll is marked at predetermined distances from a reference sprocket hole for providing reference sprocket holes within each length of film to be cut for use in the camera. Distances between reference sprocket holes fall within the predetermined filmstrip lengths. The bulk roll is then cut into the predetermined filmstrip lengths, each having the referenced sprocket hole. The predetermined lengths are loaded onto storage spools for placement in the camera. As described in the Dobbs et al. patent, the referenced sprocket hole of the filmstrip is then positioned at a leading end of the strip extending from the storage spool thereby providing for positioning a reference frame for aligning with the exposure frame of the single use camera.

By using an overlay within the camera that was used to place the latent image within the imaging filmstrip film frames, proper registration of the artwork within the frame of the pre-exposed filmstrip is achieved. Identifying a referenced sprocket hole positions a frame within exposure frame opening of the single use camera. Providing a border around the artwork permits slight movement of the pre-exposed film within the single use camera while maintaining proper alignment of the artwork within its shielded portion. Such steps as described provide for proper registration of the latent image placed within a frame for subsequent exposure of the frame using the single use camera.

One embodiment of the present invention includes the steps of providing an imaging filmstrip having multiple film frames, each film frame having an opaque portion and an image portion, the image portion having an artwork image therein, forming the imaging filmstrip into a continuous loop, placing a portion of the imaging filmstrip in contact with a corresponding contact portion of unexposed film, passing light through the filmstrip contact portion to the film contact portion for exposing the unexposed film contact portion and placing a latent image of the filmstrip artwork onto the film, thus providing a pre-exposed film having the latent image within the an image portion of a film frame corresponding to the image portion of the imaging filmstrip frame, and rotating the imaging filmstrip while advancing the unexposed film past the light for placing continuous filmstrip portions in contact with contiguous film portions along a length of the film, thus placing multiple latent images onto the film, the multiple images corresponding to the artwork images of the filmstrip.

A photographic film pre-exposure apparatus useful in pre-exposing a bulk roll of film prior to preparation of the film for use in a camera comprises a light source for exposing film placed on an opposing contact surface with a latent image of filmstrip artwork when a filmstrip having artwork image is positioned between the film and the light source, a contact surface opposing the light source, means for transferring unexposed film across the contact surface, a portion of the unexposed film positioned between the contact surface and the light source for exposing the film portion to light, and imaging filmstrip mounting means for mounting a continuous filmstrip loop, the mounting means cycling the loop for placing a portion of the filmstrip in contact with the film, a portion of the imaging filmstrip positioned between the film contact portion and the light source.

The imaging filmstrip is formed into a continuous loop and includes multiple film frames thereon, each film frame having an opaque portion for blocking light from passing therethrough, each film frame further includes an artwork image portion having an image of artwork therein. A sprocketed print drum having the contact surface thereon includes teeth for receiving sprocket holes within the film and filmstrip contact portions for aligning the film and filmstrip.

Sensing means is included for sensing rotation of the filmstrip loop. The sensing means is responsive to a metallic tape positioned on the filmstrip loop for indicating a complete cycle of the loop each time the metallic tape is sensed by the sensing means. Means for stopping the transfer of film is provided in a preferred embodiment of the invention. The stopping means is responsive to a complete revolution of the filmstrip loop and communicates with the light source for turning off the light source during the film notch punching.

BRIEF DESCRIPTION OF THE DRAWINGS

A preferred embodiment of the invention as well as alternative embodiments are described by way of example with reference to the accompanying drawings in which:

FIG. 1 is a perspective view of a bulk roll film exposure apparatus of the present invention;

FIG. 2 is a perspective partial exploded view of a camera and overlay;

FIG. 6 is a partial perspective view of an imaging filmstrip portion in contact with a portion of an unexposed filmstrip;

FIG. 7 is a partial cross-sectional view of a platen and exposure plate assembly illustrating exposure of an unexposed film to an image of an imaging film;

FIG. 8 is an exploded perspective view of a camera and pre-exposed filmstrip;

FIG. 11 is a perspective view of the imaging filmstrip formed into a loop for use in a bulk film pre-exposure apparatus of the present invention;

DETAILED DESCRIPTION OF PREFERRED EMBODIMENT

Figure 3:
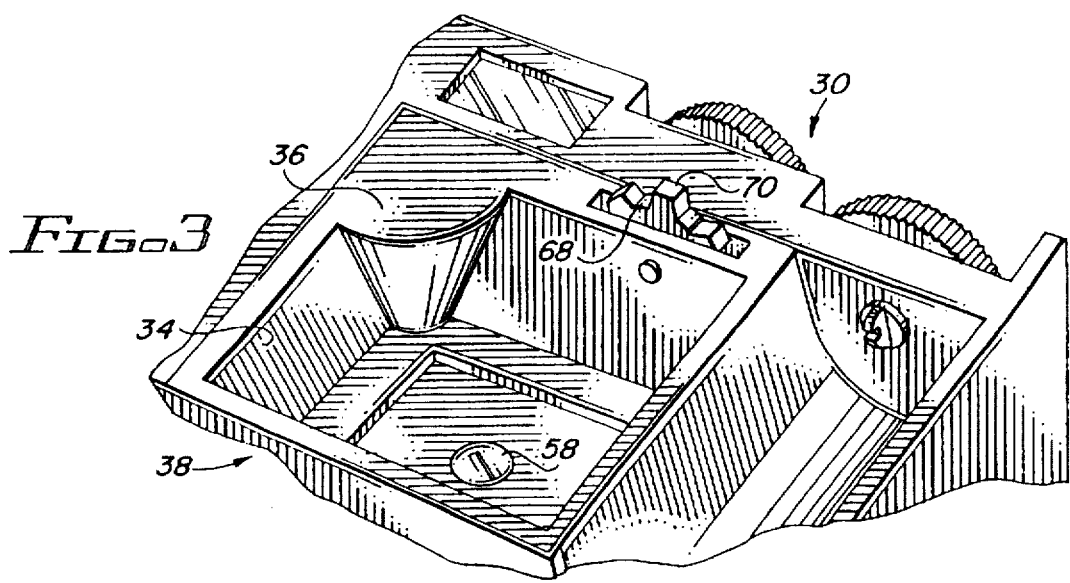
FIG. 3 is a partial perspective view of an open camera illustrating an alternate embodiment of a camera exposure frame opening.

The present invention will now be described more fully hereinafter with reference to the accompanying drawings, in which preferred embodiments of the invention are shown. This invention may, however, be embodied in many different forms and should not be construed as limited by the embodiments set forth herein. Rather, these embodiments are provided so that this disclosure will be thorough and complete, and will fully convey the scope of the invention to those skilled in the art. Like numbers refer to like elements throughout.

With reference to FIG. 1, an apparatus 10 employs an imaging filmstrip 12 formed into a continuous loop 14 for positioning against unexposed filmstrip 16 of a bulk film roll for pre-exposing the unexposed filmstrip 16 with an image formed on the imaging filmstrip 12. The apparatus 10 is configured for passing the unexposed filmstrip 16 loaded on a filmstrip supply reel 18 through a slot 20 and onto a take-up reel 22. As will be described in detail herein, the imaging filmstrip 12 and unexposed filmstrip 16 are held in contact while a light source causes images on the imaging filmstrip 12 to be placed as a latent image on the unexposed filmstrip 16. In the preferred embodiment of the present invention, positive transparency film is used for the imaging filmstrip 12 and negative film for the unexposed filmstrip 16. As will be described later in this section, a filmstrip notch punch assembly 26 marks the unexposed filmstrip 16 at predetermined locations for identifying a reference sprocket hole 96 as will be described later with reference to FIGS. 6 and 9. As will be described later in further detail, the notch punch assembly 26 is positioned for punching a notch 98, within the filmstrip 17 after it has been exposed and prior to loading onto the take-up reel 22. The notch 98 provides a recognizable reference for a person loading pre-exposed film within a camera. The apparatus 10 can be programmed to expose predetermined lengths of unexposed filmstrip 16. Such programming is done through the use of a computer 28 accessible to an operator of the apparatus 10.

The present invention provides an apparatus 10 and a method for pre-exposing the unexposed filmstrip 16, under bulk film loading conditions, to an image positioned for alignment in proper registration with a film frame of a camera 30 for a section of the bulk roll of film cut to a predetermined length. In one embodiment of the present invention, and as described with reference to FIG. 2, the camera 30 has an overlay 32 for blocking a portion of a camera exposure frame opening 34. The overlay 32 shields a portion 36 of a film frame opening 34. As further illustrated in FIG. 2, the shielded portion 36 is provided by the overlay 32. As illustrated in FIG. 3, the shielded portion 36 in an alternative camera embodiment is provided by forming the camera exposure frame opening 34 as an integral part of the camera body 38.

Figure 4:
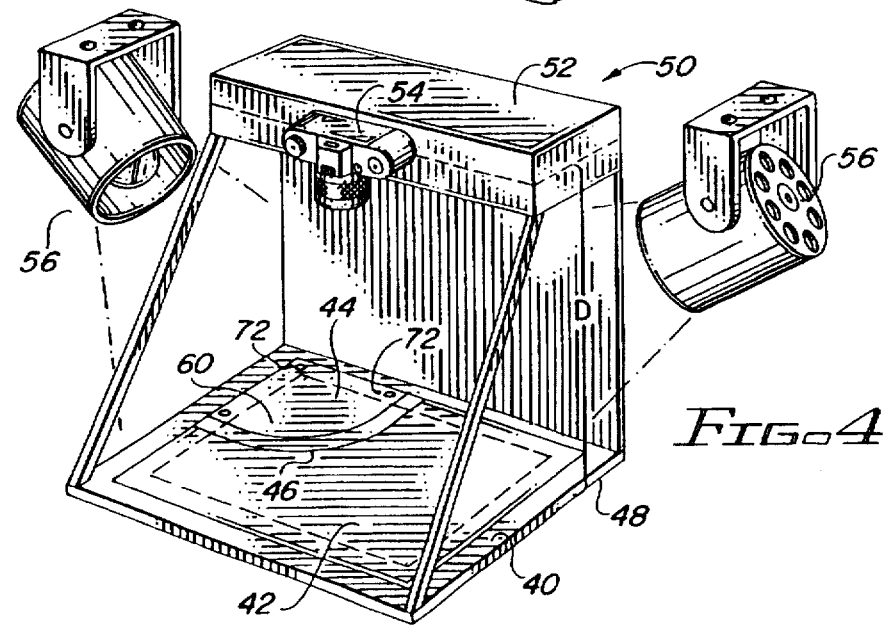
FIG. 4 is a perspective view of a copy stand useful in forming an imaging filmstrip of the present invention.

As described in the above referenced Dobbs et al. patent, the proper formation of the shielded portion 36 is necessary to provide a desirable registration of art work images placed within the shielded portion 36. To configure the shielded portion 36, as illustrated with reference to FIG. 4, a surface 40 is formed to have a black portion 42 and a white portion 44. The white portion 44 identifies an artwork image area 46 that will be seen to correspond to the shielded portion 36 within the camera frame opening 34. In one embodiment of the present invention, the surface 40 is on a base 48 of a copy stand 50.

The copy stand 50 has a support member 52 dimensioned to hold a copy camera 54 at a predetermined distance "D" from the surface 40. Imaging light sources 56 are positioned to provide imaging light onto the surface 40. In an the embodiment illustrated by way of example, the copy camera 54 is a 35 mm single reflex camera well-known for its high resolution and precision. In one embodiment of the present invention, 35 mm filmstrips are used in the various steps to be compatible with 35 mm film typically used in fun cameras such as a single use camera to which the present invention is directed but as earlier described, not limited. It is understood that the present invention including the methods and apparatus disclosed will be used with other film formats.

In preparing the imaging filmstrip 12, an overlay filmstrip is mounted within the copy camera 54. With light from the light sources 56 impinging on the surface 40, the surface 40 (having the black portion 42 and white portion 44) is photographed using the copy camera 54. The overlay filmstrip is thus exposed to the black and white portions 42 and 44 for forming a frame on the overlay filmstrip having a latent image of the portions 42 and 44 within the frame. The overlay filmstrip is developed. A developed frame is then used to form the overlay 32. In the preferred embodiment of the present invention, the overlay 32 is formed using well-known photo etching methods. An overlay 32 will typically comprise a brass or plastic sheet. In an alternative embodiment of the present invention, the developed overlay filmstrip frame is used to form the shielded portion 36 as an integral part of the single use camera body 38 to form the exposure frame opening 34 of the camera 30 as illustrated again with reference to FIG. 3.

Figure 9:
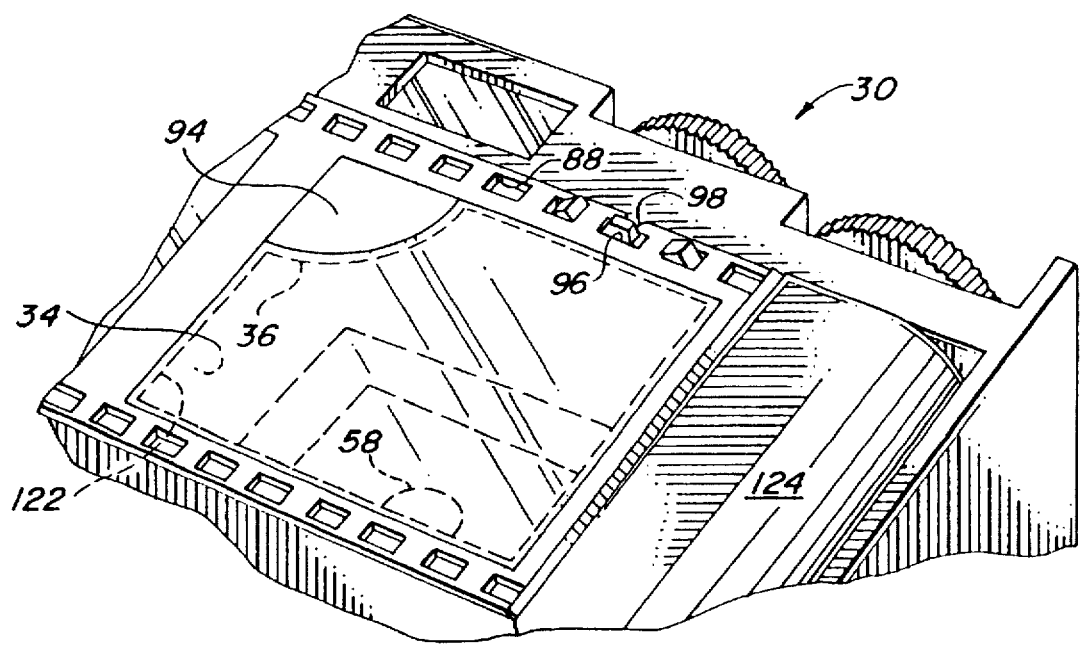
FIG. 9 is a partial perspective view of pre-exposed film loaded within a camera.
Figure 10:
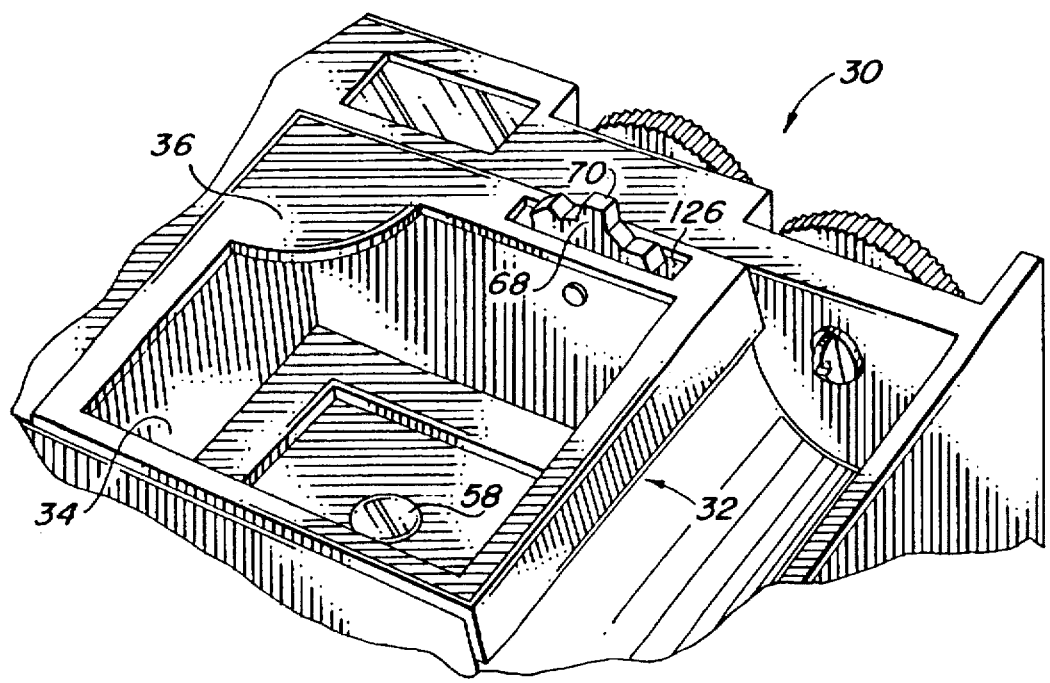
FIG. 10 is a partial perspective view of an open-back for a camera illustrating placement of an overlay.

As illustrated again with reference to FIGS. 2 and 3, and to FIGS. 9 and 10, the camera 30 has the exposure frame opening 34 of a predetermined configuration having the shielded portion 36 for defining the artwork image area 46 corresponding to that portion of the film frame within which a latent image of the art work is placed for ultimate development of pre-exposed film. Once the camera 30 as illustrated again with reference to FIG. 2 and in FIG. 3 has the film frame 34 formed, a second or alignment filmstrip is mounted within the camera 30 having the formed frame opening 34 with its shielded portion 36. The alignment filmstrip is exposed to light sufficiently bright to form a latent image of the exposure frame opening 34 onto a frame of the alignment filmstrip. In the preferred embodiment of the present invention, the alignment filmstrip is exposed to bright sunlight through a lens 58 of the camera 30. The alignment filmstrip, a positive transparency film, by way of example, as described earlier, is developed to form a film frame corresponding to the exposure frame opening 34. The artwork image area 46 is opaque and the open area defined by the exposure frame opening 34 is clear after the film has been developed. The developed alignment filmstrip is mounted within the copy camera 54 such that the surface 40 upon which art work will be placed, can be viewed through an open back of the copy camera 54. By viewing the surface 40 through the developed alignment filmstrip mounted in the copy camera 54, the artwork image area 46 is clearly defined by the opaque portion of the alignment filmstrip frame. In this way, the artwork image area 46 has now been defined in registration with the exposure frame opening 34 of the single use camera 30.

Figure 5:
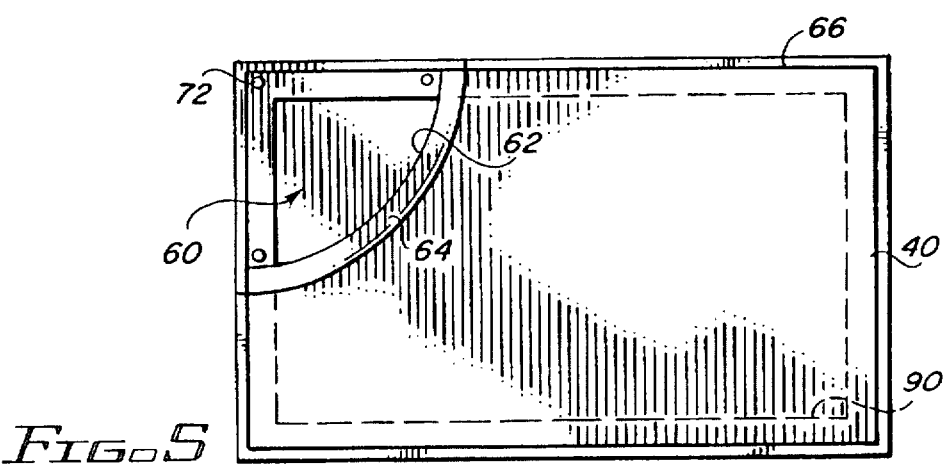
FIG. 5 is a top plan view of the copy stand base surface illustrating the placement of artwork onto the surface.

With reference to FIG. 5, artwork 60 having an edge portion 62 is placed within an area of the film frame earlier defined as the artwork image area 46 on the surface 40. In the preferred embodiment, the artwork edge portion 62 forms a gap 64 with the artwork image area edge 62. Such a gap 64 allows for some movement of pre-exposed filmstrip mounted within the camera 30 due to the likely movement of a sprocket gear wheel 68, because of loose tolerances of the wheel 68, or because of filmstrip movement due to differences between a sprocket wheel gear tooth 70 affixed within a sprocket hole of the filmstrip not sized precisely with the sprocket wheel gear tooth 70. In one embodiment of the present invention, the gap 64 is approximately 3/16" wide. Further, the exposure frame opening 34 is sized slightly larger than the artwork area 46 when the artwork 60 comprises a primarily black outer portion and the exposure frame opening 34 is sized slightly smaller than the artwork 60 when the artwork outer or perimeter portion comprises primarily a white border.

As illustrated again with reference to FIGS. 4 and 5, the artwork 60 is placed within the artwork image area 46. The copy camera 54 is then loaded with a third filmstrip or the imaging filmstrip 12 (here in its unexposed condition) for exposing the imaging filmstrip 12 to the artwork 60 for forming a latent image of the artwork onto the imaging filmstrip 12. A predetermined number of frames is exposed to the artwork 60 illuminated by imaging light source 56. As illustrated with reference again to FIGS. 4 and 5, the artwork 60 is held in position by registration pins 72. Flat artwork 60 is illustrated here by way of example. However, it is expected that artwork 60 will be three-dimensional or two-dimensional in form. When the artwork 60 is of a two-dimensional form, a rigid transparent sheet 66 is placed over the two-dimensional artwork for holding the artwork 60 in a fixed single plane for focusing the copy camera 54 onto that plane thereby providing a sharply defined image of the artwork 60 onto the imaging filmstrip. The artwork 60 is photographed onto a predetermined number of frames of the imaging filmstrip 12. It is anticipated that the artwork 60 is replaced with alternative works of art of similar or varying format. The alternative artwork is held within the artwork image area 46 as described for the artwork 60. Again, a predetermined number of frames of the imaging filmstrip 12 is exposed to the alternative artwork. In a preferred embodiment, the imaging filmstrip 12 comprises 12, 24 and 36 exposures based on the predetermined nature of the resulting camera pre-exposed film planned. The imaging filmstrip 12 is developed having a multiplicity of frames wherein each frame includes the artwork 60 or alternative artwork.

As illustrated with reference to FIG. 6, the developed imaging filmstrip 12, having sprocket holes 76 along edge portions 78 is aligned with an unexposed filmstrip 16, as illustrated again with reference to FIG. 1 to that portion of the bulk film leaving the supply reel 18 for exposure when passing through the slot 20 and loading onto the take-up reel 22 as exposed filmstrip 17, for the purpose of exposing the unexposed filmstrip 15 16 to the artwork 60 for providing an artwork image 82 within an artwork portion 94 of the imaging filmstrip frame 90 as earlier described. In the preferred embodiment, an emulsion surface 84 of the imaging filmstrip 12 is placed against an emulsion surface 86 of the unexposed filmstrip 80, as illustrated again with reference to FIG. 6. The sprocket holes 76 of the imaging filmstrip 12 are aligned with sprocket holes 88 of the unexposed filmstrip 16. As is understood by those skilled in the art, those steps involving the use of unexposed film is carried out within darkroom environment conditions. Further, again with reference to FIG. 6, and as appreciated from the previous discussion, each frame 90 of the imaging filmstrip 12 has an opaque portion 92 corresponding to the black portion 42 of the surface as earlier described and an image portion 94 having an image of the artwork 60 as was positioned within the artwork image area 46 as described earlier. Once the sprocket holes 88 and 76 have been aligned, a reference sprocket hole 96 is marked with a notch 98 for positioning a pre-exposed filmstrip image in registration with the exposure frame opening 34 of the camera 30. As further illustrated with reference to FIG. 6, a second surface 100 of the imaging filmstrip 12 is exposed to light sufficiently bright for placing a latent image of the artwork 60 onto the filmstrip 80.

In one embodiment of the present invention, the unexposed filmstrip 80 is configured as a pre-determined length. By way of example, typical 35 mm filmstrip is prepared for permitting exposure of 12, 24 or 36 frames. A corresponding imaging filmstrip 12 is used to expose a single unexposed filmstrip 80 as illustrated in FIG. 7. A platen 102 is provided for holding the filmstrip first surfaces 84 and 86 in uniform contact with each other. The platen 102 is dimensioned for covering the filmstrips 12 and 16 which are placed onto an exposure plate 104. In one embodiment, a light source 106 is provided in the form of an incandescent light for distributing light uniformly onto the exposure plate 104. A diffusion grid 108 is placed between the light source 106 and the exposure plate 104 for diffusing light and ensuring that a uniform exposure of the exposure plate 104 and thus the filmstrip 12 is provided. The imaging filmstrip 12 is placed onto a surface of the exposure plate 104. The unexposed filmstrip 16 is aligned with the imaging filmstrip 12 using an alignment pin 110. As described earlier, the preselected reference sprocket hole 96 is marked by forming a notch 98 at the reference sprocket hole 96 for aligning the unexposed filmstrip 16 once the pre-exposed filmstrip 17 in the camera 30 for subsequent exposure. To further provide uniform contact of the filmstrip surfaces 84 and 86, a pad 114 is affixed to a surface of the exposure plate 104. Again, as is well known in the art, such steps discussed take place in a darkroom environment.

With reference to FIG. 8, the now pre-exposed filmstrip 17 of a predetermined length, is loaded onto a take-up spool 116 adapted to fit within a film roll receiving cavity 118 of the camera 30. The leading edge of the filmstrip 17 having the preselected reference sprocket hole 96 with a notch 98 as illustrated with reference to FIG. 9 is positioned within the camera 30 such that the artwork image portion 94 will be shielded by the shielded portion 36 and the exposure frame opening 34 is aligned with a filmstrip frame 122 of the pre-exposed filmstrip 17. As is well known for the fun cameras 30, a film cassette 124 is used to take up subsequently exposed filmstrip frames 122. The filmstrip 17 is removed from the camera 30 once second exposures have been made by a user. The now doubly exposed filmstrip 17 is then processed by well known film developing methods.

With reference to FIG. 10, the overlay 32 has a slot 126 along a peripheral portion of the overlay 32 for permitting gear teeth 70 of a sprocket wheel 68 to extend beyond the overlay 32 and communicate with the sprocket holes 88 of the pre-exposed film 17 as described with reference to FIG. 9. With such an overlay 32, existing cameras 30, such as single use cameras are easily and inexpensively adapted for use with the pre-exposed film 17.

As was discussed earlier with reference to FIG. 1, in the apparatus 10, the imaging filmstrip 12 is formed into the continuous loop 14. With reference to FIG. 11, the loop 14 is formed from the imaging filmstrip 12 by affixing ends of the imaging filmstrip with a splice 127. A predetermined number of frames 90 is then established for the loop 14. In one embodiment of the present invention, imaging filmstrip 12 having 24 frames is used. It is anticipated that alternative numbers of frames 90 will be incorporated by those pre-exposing film to images as described herein. As described earlier, by changing the artwork 60 illustrated in FIG. 4 and exposing a predetermined number of frames 90 to a first artwork and then exposing predetermined number of frames to a second artwork, a variety of entertaining configurations is achieved for placing multiple artwork images 82 within the imaging filmstrip 12. In addition, the apparatus 10 provides an efficient way of pre-exposing unexposed bulk filmstrip 16 for subsequent cutting into predetermined filmstrip lengths.

Figure 12:
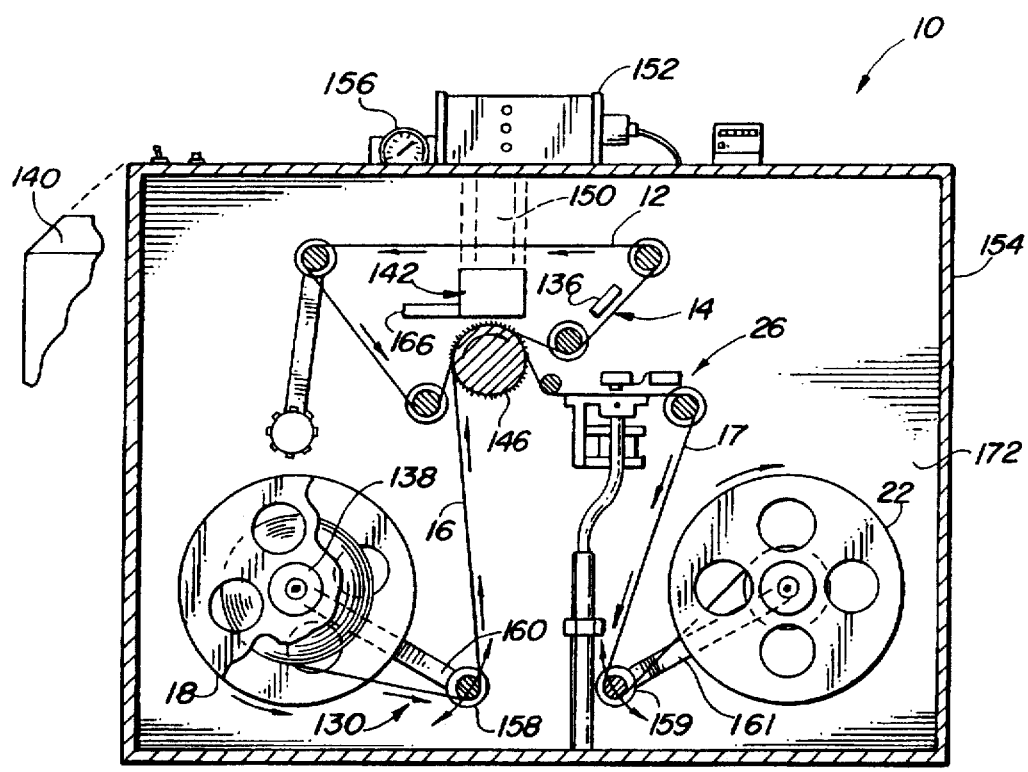
FIG. 12 is a front elevation view of an improved embodiment of the apparatus of FIG. 1.

The following further describes the apparatus 10 and the improvements made to same for providing an effective and efficient procedure for pre-exposing photographic film and placing a latent image of the selected artwork 60 as earlier described on the bulk roll of film for preparing individual filmstrips of predetermined lengths for use in the camera 30. As earlier described, the apparatus 10 places the notch 98 onto the pre-exposed filmstrip 17. In one embodiment of the present invention, the notch 98 is placed every 248 sprocket holes 88 on the bulk roll of film. The notch 98 is then used by a technician, by way of example, for loading the pre-exposed filmstrip 17 into the camera 30. Typically, the bulk roll of film 130 can be 2700 feet long. The bulk film 130 advances from the supply reel 18 on the left side of the apparatus 10 as illustrated again with reference to FIG. 1, and with reference to FIG. 12, to the take-up reel 22 on the right side of the apparatus 10 after being pre-exposed for receiving a latent image of the artwork 60 as earlier described.

Figure 13:
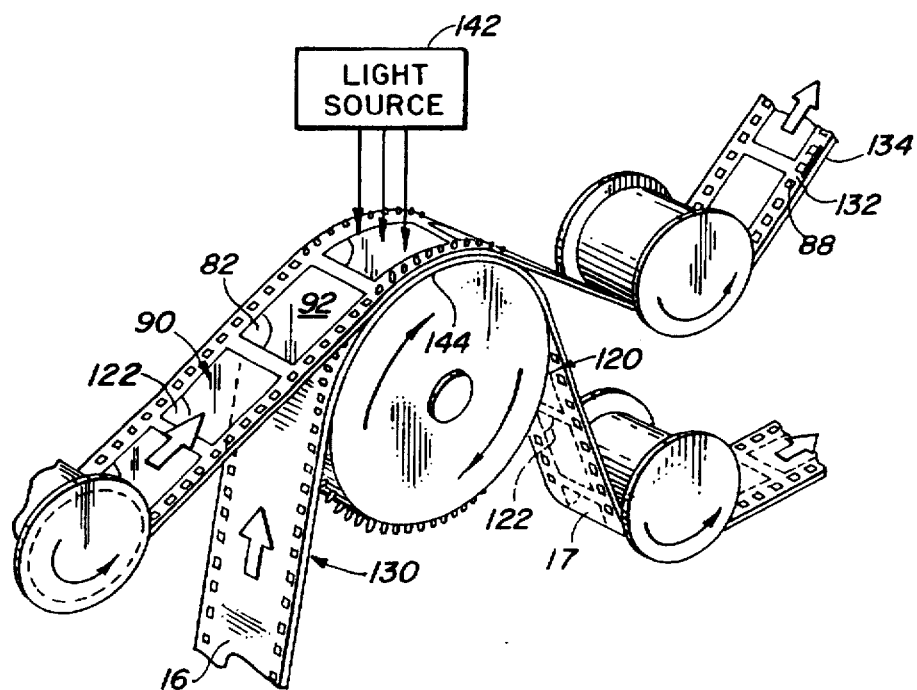
FIG. 13 is a partial perspective view of a film exposure portion of the apparatus of FIG. 12.

The loop 14 of the imaging filmstrip 12 includes a metallic tape 132, 2 mm wide by 8 mm long, placed between the sprocket holes 88 and an edge 134. The metallic tape is sensed by a filmstrip loop sensor 136 for initiating the punching of the notch 98 and locating of the reference sprocket hole 96 within the predetermined filmstrip lengths of the bulk film 130. Again with reference to FIG. 12, the apparatus 10 is loaded with the bulk film 130 under darkroom conditions. The bulk film 130 is removed from its light-tight container in which it is typically shipped and stored, and placed onto the supply reel 18. Typically, the bulk film 130 is stored without a reel and referred to as a "pancake" which when removed from its storage container is placed between two halves of the supply reel 18, which halves are then tightened and rotatably mounted onto the apparatus 10. The supply reel 18 is placed on a spindle 138. A cover 140 encloses the bulk film 130 during the pre-exposing process. Four to five feet of bulk film 130 is then unwound from the supply reel 18 and threaded around a series of pulleys and rollers, as illustrated again with reference to FIG. 12, and across the punch assembly 26 after which it is attached to the take-up reel 22. The take-up reel 22 is also of a split reel style for easy removal of the bulk film 130 after pre-exposure. The loop 14 is then installed over its respective rollers, again as illustrated with reference to FIG. 12 for passing over the loop sensor 136 and between a light source 142 and the bulk film 130 as further illustrated with reference to FIG. 13. The imaging filmstrip 12 making up the loop 14 includes a portion 144 which is in contact with the bulk film 130 when that portion 144 passes over a sprocketed print drum 146. This contact film portion 144 is the only contact area for the imaging filmstrip 12 and the bulk film 130, and it is here that the pre-exposure of the bulk film 130 takes place. The bulk film 130 thus transitions from unexposed filmstrip 16 to pre-exposed filmstrip 17 having a latent image of the imaging filmstrip artwork as earlier described. The continuous imaging filmstrip loop 14 thus places multiple contiguous frames 120 having the imaging filmstrip artwork image 82 as a latent artwork image 122 onto the now pre-exposed bulk film 17.

Figure 14:
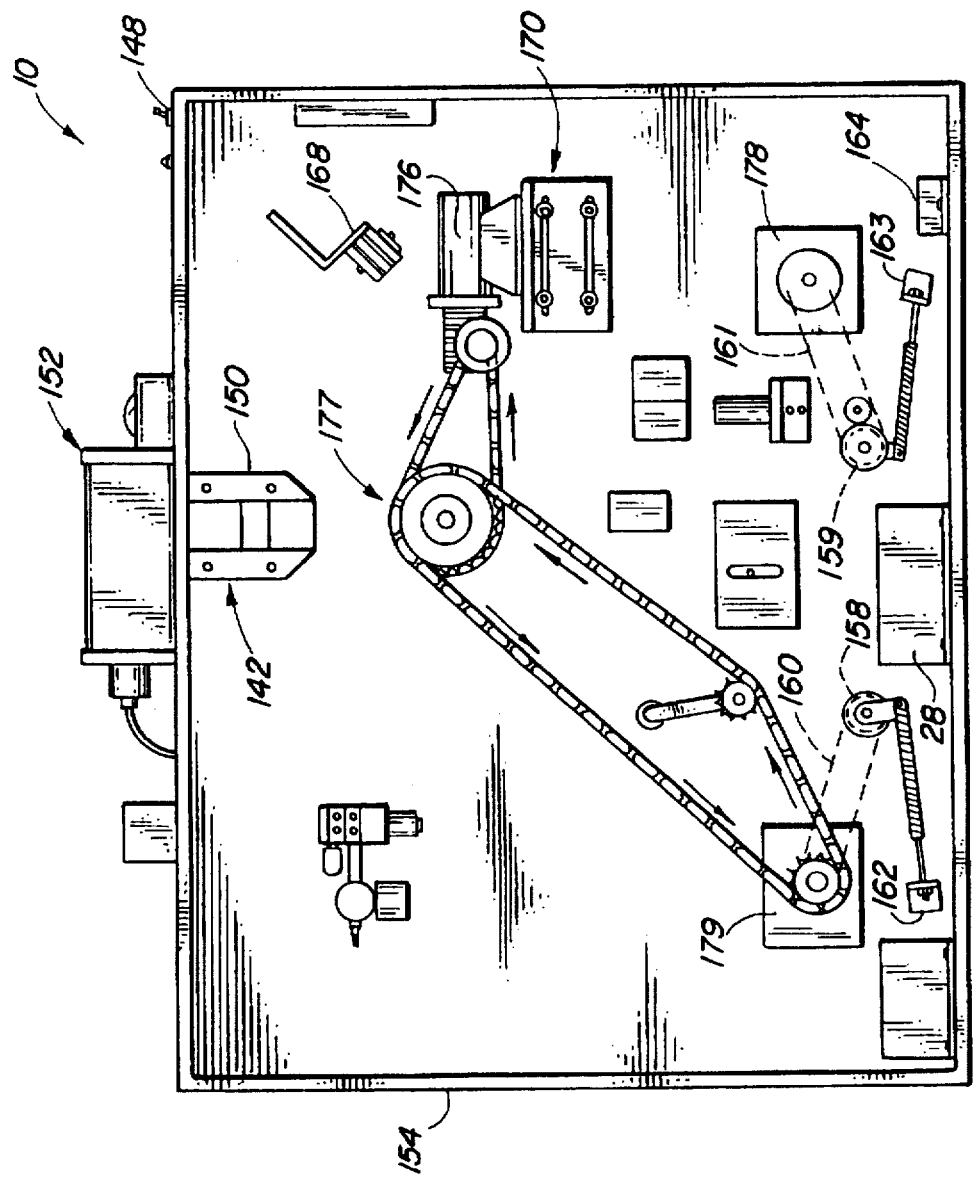
FIG. 14 is a rear elevation view of the apparatus of FIG. 12.

Consider the operation of the apparatus 10 in further detail with reference again to FIG. 12, and with reference to FIG. 14. With the bulk film 130 and loop 14 loaded onto the apparatus 10 and the cover 140 in place, the apparatus 10 is ready for operation for pre-exposing the bulk film 130 and placing notches 98 for locating the reference sprocket holes 96. A power switch 148 is switched on and a start/stop button 150 pushed. The reels 18, 22 begin turning and the light source 142 comes on, exposing the bulk film 130 as it passes beneath a light tube 150 delivering light from a dichroic lamp housing 152 positioned on an apparatus housing 154. Each time the loop completes one revolution, the metallic tape 132 passes across the sensor 136, stopping the advancement of the film 130 momentarily, turning off the light source 142 for preventing film fogging, and punching the notch 98 for identifying the reference sprocket hole 96.

In an embodiment of the present invention, initially, six to eight revolutions are generally made for exposing and preparation of six to eight film rolls for use in the camera 30. This initial exposure provides film for testing and evaluation of film exposure, color balance, accuracy of punch and clarity of image. Adjustments to exposure are made using a density control 156 which is a potentiometer for use in controlling brightness of the light source 142. In an alternate embodiment, neutral density filters are placed within the lamp housing 152 for controlling the amount of light delivered by the light tube 150 to the print drum 146. Color balance is typically made by adding or subtracting yellow, magenta, or cyan from the dichroic lamp housing 152. Accuracy of the notch location is adjusted by moving the metallic tape 132 on the loop 14 forward or backward so that the punch assembly 26 will punch the bulk film 130 directly across from the reference sprocket hole 96 and not between two adjacent holes 88. Such testing and adjustment provides accuracy in positioning the pre-exposed film within the camera 30 and leaves little uncertainty when it is time to load the pre-exposed filmstrip 17 into the camera 30.

The clarity of the latent image placed onto the film 130 is directly related to the speed at which the imaging filmstrip 12 passes over the bulk film 130 at the contact portion 144. The faster the films run over the sprocketed print drum 146, the more shaking or sliding of film can occur. A blurred image will then result. To achieve maximum efficiency, running the apparatus 10 at as high a speed as possible for the drive mechanism smooths out any unwanted vibration and results in a clear image. Therefore, exposure or density must be controlled to cooperate with the speed of the film.

Additional features are included in the preferred embodiment of the apparatus 10 illustrated and described herein. Film dancer wheels 158, 159 are rotatably attached to arms 160, 161 respectively for maintaining tension within the bulk film 130. As tension falls or slacks at either end of a production, the dancer arms 160, 161 rotate or drop downward. The dancer arms 160, 161 typically rock up and down continuously during a pre-exposure production process. If one should fall to a maximum allowable level, it will make contact with an arm contact switch 162,163 respectively for each arm 160, 161, as illustrated with reference to FIG. 14 illustrating a back side of the apparatus 10. If contact is made for more than one revolution of the loop 14, the apparatus 10 will shut down and an alarm will sound at a film out sensor 164.

The light source 142 includes two sensors, a first sensor within the lamp housing 152 that monitors a lamp being used. If the lamp burns out or drops below a specified power level, the apparatus 10 stops its pre-exposing operation and an alarm is sounded for warning the technician operating the apparatus 10. The light tube 150 directs light onto and through the loop 14 and onto the bulk film 130. It must be set for avoiding film fogging should light enter other portions of the covered housing 154. A safety switch 166 permits the apparatus 10 to operate only when the tube 150 is set properly for holding light within the tube 150 and not leaking therefrom.

As a further safety feature, should the film loop 14 make two revolutions without sensing the metallic tape 132 the computer 28 monitoring such will provide a stop signal to the apparatus 10 and initiate an alarm. With such a feature, film is not wasted in the event the metallic tape 132 is no longer making contact with the sensor 136 or has fallen off of the loop 14, by way of example. Pressure on the loop 14 is monitored by a pressure sensor 168 mounted on the backside 170 of the apparatus 10 and passing through to the front side 172 where the loop 14 is located as illustrated again with reference to FIGS. 12 and 14. In the event that the loop 14 should break, the sensor 168 will detect such and stop operation of the apparatus 10.

A punch sensor 174 will stop the operation of the apparatus 10 if the punch assembly 26 gets stuck in a closed position and thus malfunctions to very likely tear the film 130. Further, the apparatus 10 will be stopped in the event that the punch assembly 26 is stuck in a retracted position, avoiding film 130 not getting properly punched. Generally, these situations are caused by low pressure in the pressurized style punch assembly 26 of the preferred embodiment described herein.

The operation of the apparatus 10 is dependent upon all of its components being tuned and calibrated for cooperation in meeting the need to pre-expose the film 130 and provide a notch 98 for guiding a person cutting the pre-exposed bulk film 17 into preselected lengths depending on whether the filmstrip 12 included 12, 24, or 36 exposures, and loading the cut lengths of the pre-exposed film 17 into the camera 30. In a preferred embodiment of the present invention, herein described, a drive motor 176 drives the drum 146 and take-up reel 22 through a chain drive assembly 177, thus turning the loop 14 and advancing the bulk film 130 as again illustrated with reference to FIGS. 12 and 14. Further, the take-up reel 22 and supply reel 18 are equipped with clutch mechanisms 178, 179 for maintaining equal tension on the film 130 as it moves from the supply reel 18 and loaded onto the take-up reel 22. The print drum 146 and take-up reel 22 are further equipped with electric brake systems that engage when the loop sensor 136 reads the tape 132 and punches the film 130. With such features, the preferred embodiment herein described for the apparatus 10 produces approximately 700 rolls of pre-exposed 24 exposure filmstrip per hour.

While specific embodiments of the invention have been described in detail hereinabove, it is to be understood that various modifications may be made from the specific details described herein without departing from the spirit and scope of the invention as set forth in the appended claims. Having now described the invention, the construction, the operation and methods of use of the preferred embodiments thereof, and the advantageous new and useful results obtained thereby, the new and useful methods and construction and reasonable equivalents thereof obvious to those skilled in the art, are set forth in the appended claims.

What is claimed is:

1. A method for pre-exposing film comprising the steps of:

providing an imaging filmstrip having multiple film frames, each film frame having an opaque portion and an image portion, the image portion having an artwork image therein;

forming the imaging filmstrip into a continuous loop;

placing a portion of the imaging filmstrip in contact with a corresponding contact portion of unexposed film;

passing light through the filmstrip contact portion to the film contact portion for exposing the unexposed film contact portion and placing a latent image of the filmstrip artwork onto the film, thus providing a pre-exposed film having the latent image within the an image portion of a film frame corresponding to the image portion of the imaging filmstrip frame; and rotating the imaging filmstrip while advancing the unexposed film past the light for placing continuous filmstrip portions in contact with contiguous film portions along a length of the film, thus placing multiple latent images onto the film, the multiple images corresponding to the artwork images of the filmstrip.

2. A film pre-exposing method according to claim 1, further comprising the steps of:

aligning filmstrip and film sprocket holes; and marking a reference sprocket hole within the advancing film for every complete revolution of the filmstrip loop, each reference sprocket hole providing an alignment sprocket hole within a preselected length of the pre-exposed film.

3. A film pre-exposing method according to claim 2, further comprising the step of cutting the pre-exposed film into preselected lengths wherein each preselected length includes one reference sprocket hole for guiding a user in loading the pre-exposed film into a camera.

4. A film pre-exposing method according to claim 2, wherein the marking step comprises the step of punching a notch adjacent the film reference sprocket hole.

5. A film pre-exposing method according to claim 1, wherein the imaging filmstrip and film have 35 mm film formats.

6. A film pre-exposing method according to claim 1, further comprising the step of stopping the filmstrip rotation and film advancing for pre-exposing the film.

7. A film pre-exposing method according to claim 1, further comprising the steps of:

loading the unexposed film onto a supply reel;

threading an end of the film onto a take-up reel; and driving the take-up reel for the film advancing step.

8. A film pre-exposing method according to claim 7, wherein the unexposed film comprises a bulk roll of film.

9. A film pre-exposing method according to claim 1, wherein the filmstrip placing step comprises the steps of:

placing the film contact portion over a sprocketed print drum contact portion wherein sprocket teeth receive film sprocket holes; and placing the filmstrip contact portion over the film contact portion wherein the filmstrip contact portion, sprocket holes within the filmstrip received by the sprocket teeth receiving the film sprocket holes, thus aligning the filmstrip with the film at communicating film, filmstrip and print drum contact portions.

10. A photographic film pre-exposure apparatus useful in pre-exposing a bulk roll of film prior to preparation of the film for use in a camera, the apparatus comprising:

a light source for exposing film placed on an opposing contact surface with a latent image of filmstrip artwork when a filmstrip having artwork image is positioned between the film and the light source;

a contact surface opposing the light source;

means for transferring unexposed film across the contact surface, a portion of the unexposed film positioned between the contact surface and the light source for exposing the film portion to light; and imaging filmstrip mounting means for mounting a continuous filmstrip loop, the mounting means cycling the loop for placing a portion of the filmstrip in contact with the film, a portion of the imaging filmstrip positioned between the film contact portion and the light source.

11. A photographic film pre-exposure apparatus according to claim 10, further comprising an imaging filmstrip formed into a continuous loop, the imaging filmstrip having multiple film frames thereon, each film frame having an opaque portion for blocking light from passing therethrough, each film frame further having an artwork image portion having an image of artwork therein.

12. A photographic film pre-exposure apparatus according to claim 10, further comprising a sprocketed print drum having the contact surface thereon, the sprocketed drum having teeth for receiving sprocket holes within the film and filmstrip contact portions for aligning the film and filmstrip.

13. A photographic film pre-exposure apparatus according to claim 10, further comprising:

a supply reel for holding a bulk roll of unexposed film; and a take-up reel for receiving the bulk roll of film after being exposed to light from the light source.

14. A photographic film pre-exposure apparatus according to claim 10, wherein the film transferring means comprises a film drive system including motor and drive train for driving the take-up reel and print drum, the drive system transferring the unexposed film across the print drum and onto the take-up reel.

15. A photographic film pre-exposure apparatus according to claim 10, further comprising a punch assembly cooperating with the film transferring means for receiving the film, the punch assembly punching a notch within an edge portion of the film for each cycle of the filmstrip loop.

13

16. A photographic film pre-exposure apparatus according to claim 15, further comprising sensing means for sensing rotation of the filmstrip loop, the sensing means responsive to a metallic tape positioned on the filmstrip loop for indicating a complete cycle of the loop each time the metallic tape is sensed by the sensing means.

17. A photographic film pre-exposure apparatus according to claim 15, further comprising means for stopping the transfer of film, the stopping means responsive to a complete revolution of the filmstrip loop, the stopping means communicating with the light source for turning off the light source during the film notch punching.

18. A photographic film pre-exposure apparatus according to claim 10, wherein the light source comprises:

a lamp housing; and a light tube within the housing, the light tube delivering light from a lamp within the lamp housing proximate the contact surface for exposing the film.

19. A photographic film pre-exposure apparatus according to claim 10, further comprising exposure adjusting means comprising at least one of light source output control, neutral density filter means positioned between the light source and the film, and film transfer speed control, the film transfer speed control communicating with the transferring means.

20. A photographic film pre-exposure apparatus according to claim 10, further comprising a light tight housing for pre-exposing the film within dark room conditions, the housing including the contact surface, film transferring means, and imaging filmstrip mounting means therein.

21. A photographic film pre-exposure apparatus useful in pre-exposing a bulk roll of film prior to preparation of the film for use in a camera, the apparatus comprising:

a housing;

a light source carried by the housing;

a sprocketed print drum carried by the housing, the drum having a contact surface thereon, the sprocketed drum having teeth for receiving sprocket holes within film and filmstrip contact portions for aligning the film and filmstrip, the drum contact surface opposing the light source;

a supply reel rotatably mounted to the housing, the supply reel positioned for holding a bulk roll of unexposed film to be feed across the drum;

a take-up reel for receiving the bulk roll of film after movement across the drum contact surface;

imaging filmstrip mounting means carried by the housing, the mounting means for continuous cycling of a filmstrip loop across the drum and film contact portions, the mounting means cycling the loop for placing a portion of the filmstrip in contact with the film, the filmstrip portion positioned between the film contact portion and the light source for exposing the film contact portion to an image on the filmstrip contact portion; and

14 drive means mounted within the housing, the drive means for advancing the unexposed film across the sprocketed drum contact surface.

22. A photographic film pre-exposure apparatus according to claim 21, further comprising an imaging filmstrip formed into a continuous loop, the imaging filmstrip having multiple film frames thereon, each film frame having an opaque portion for blocking light from passing therethrough, each film frame further having an artwork image portion having an image of artwork therein.

23. A photographic film pre-exposure apparatus according to claim 21, further comprising:

filmstrip sensing means for sensing rotation of the filmstrip loop, the sensing means responsive to a metallic tape positioned on the filmstrip loop for indicating a complete cycle of the loop each time the metallic tape is sensed by the sensing means; and punch means for forming a notch adjacent preselected reference sprocket holes of the film, the punch means communicating with the filmstrip sensing means for forming one notch for each completed cycle of the filmstrip loop.

24. A photographic film pre-exposure apparatus according to claim 23, further comprising means for stopping the transfer of film, the stopping means responsive to a complete revolution of the filmstrip loop, the stopping means cooperating with the light source for turning off the light source during the film notch punching.

25. A photographic film pre-exposure apparatus according to claim 21, wherein the drive means comprises a variable speed motor and drive train for driving the take-up reel and print drum.

26. A photographic film pre-exposure apparatus according to claim 10, wherein the light source comprises:

a lamp housing; and a light tube within the housing, the light tube delivering light from a lamp within the lamp housing for exposing the drum contact surface to light, thus exposing the film and placing a latent image thereon of an image on the imaging filmstrip.

27. A photographic film pre-exposure apparatus according to claim 21, further comprising exposure adjusting means comprising at least one of light source output control, neutral density filter means positioned between the light source and the film, and film transfer speed control, the film transfer speed control communicating with the transferring means.

28. A photographic film pre-exposure apparatus according to claim 21, further comprising a light tight cover, the cover removable for loading the unexposed film from supply reel to take-up reel under darkroom conditions and permitting operation of the apparatus under lighted conditions.

* * * * *